United States Patent [19]

Dimiceli

[11] 4,363,084

[45] Dec. 7, 1982

[54] PORTABLE LIGHTING SYSTEM

[75] Inventor: Michael A. Dimiceli, Kane, Ill.

[73] Assignee: Allison Manufacturing Company, Barrington, Ill.

[21] Appl. No.: 179,266

[22] Filed: Aug. 18, 1980

[51] Int. Cl.³ .............................................. F21V 21/14
[52] U.S. Cl. .................................... 362/250; 362/269; 362/287; 362/427; 362/431
[58] Field of Search ............... 362/249, 250, 931, 269, 362/287, 427, 431

[56] References Cited

U.S. PATENT DOCUMENTS 4,228,489  10/1980  Martin ................................ 362/250

Primary Examiner—Stephen J. Lechert, Jr.
Attorney, Agent, or Firm—Robert E. Wagner; Ralph R. Rath

[57] ABSTRACT

A portable emergency lighting system includes a base that has an upwardly directed socket with a post adapted to be received in the socket and an elongated bar having a second socket received on the upper end of the post and having one or more lights supported thereon. The first socket on the base has a pin extending across the opening and the post has a plurality of angularly related recesses respectively adapted to receive the pin while the opposite end has a like number of angularly related recesses which are angularly offset from the lower set and cooperate with a second pin in the second socket so that the light can be held in a plurality of distinct positions on the upper end of the post for each distinct position between the lower end of the post and the base.

11 Claims, 6 Drawing Figures

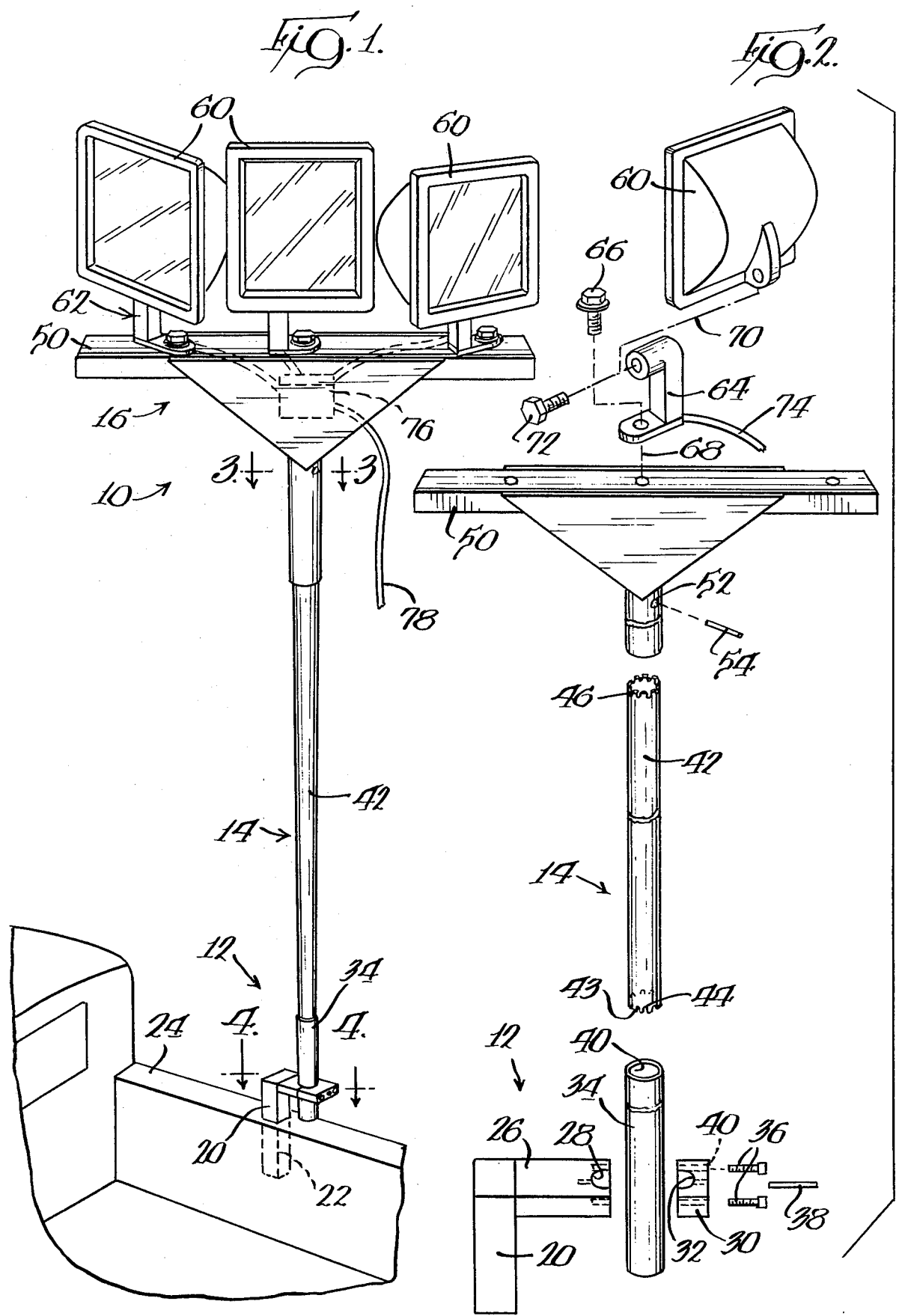

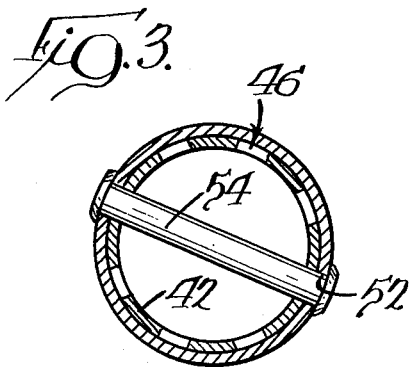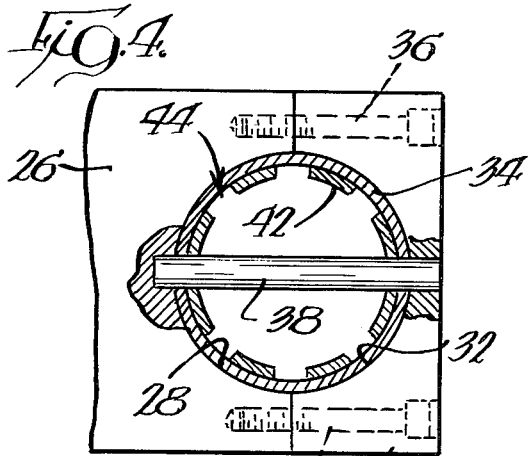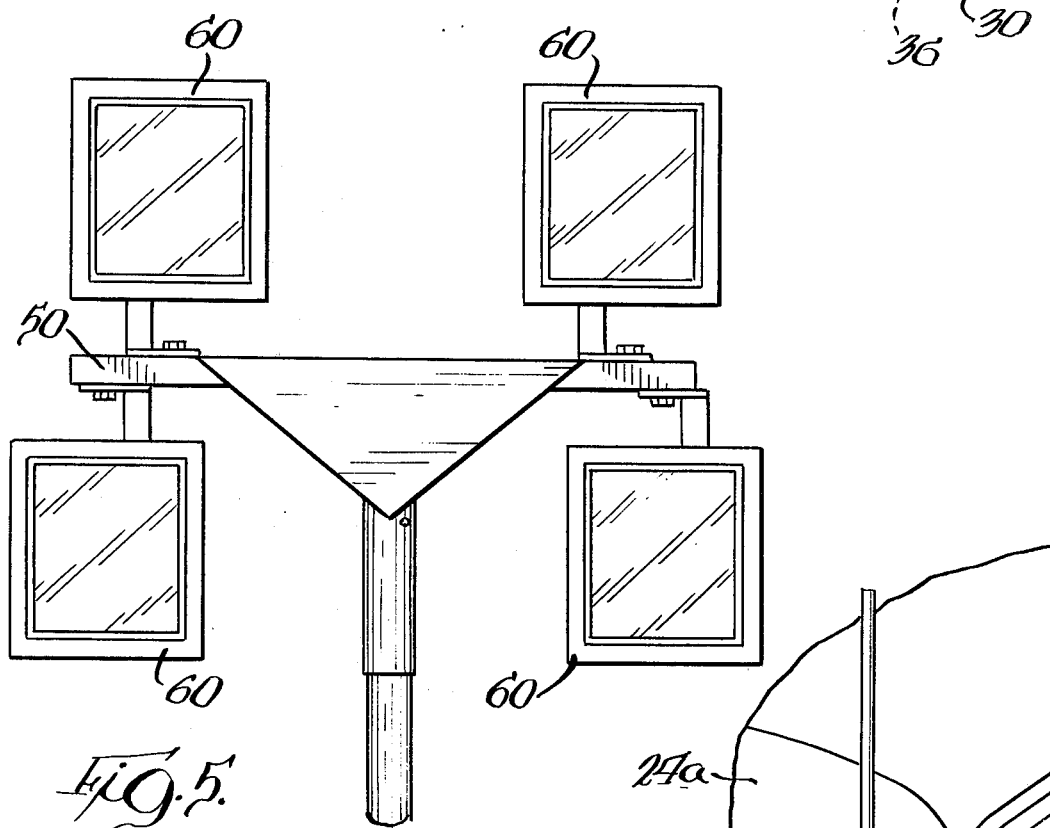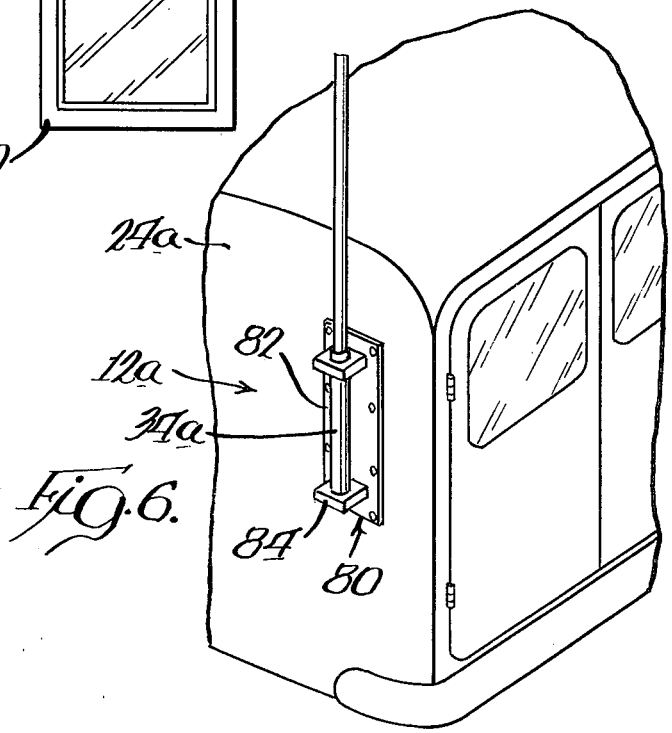

PORTABLE LIGHTING SYSTEM

TECHNICAL FIELD

The present invention relates generally to lighting systems and, more specifically, to a portable lighting system used in areas where a permanent lighting system is impracticable.

BACKGROUND PRIOR ART

Portable lighting systems have been in use for sometime, particularly in the fire fighting field. When fighting fires, it is many times necessary to have additional lighting than which is available, and usually such lighting requires a separate power source since commercial power is generally not readily available in areas of fires.

In such emergency conditions, it is usually necessary to be able to erect such a lighting system in a short period of time and also to provide directional capability that is easily adjustable so that the light can be directed to the desired location.

Prior art lighting systems of this type, particularly for emergency lighting for fire equipment crews, normally consists of a system that is attached to the fire trucks and is hydraulically actuated to provide height and angle adjustment of the lights. Such a system requires complicated hydraulic connections and also requires a separate hydraulic pump for providing the necessary pressurized fluid to manipulate the hydraulic cylinders.

SUMMARY OF THE INVENTION

According to the present invention, a unique emergency lighting system has been developed which can easily be erected in a short period of time, can be constructed from readily available materials and can easily be adapted to be directed to any point circumscribing an arc of 360°.

More specifically, the portable lighting system of the present invention includes a base that is adapted to be supported on a structure, such as a vehicle frame, and defines an upwardly open socket which has a pin extending across the opening intermediate opposite ends of the socket. An elongated post or tubular member has a plurality of angularly related recesses, each adapted to receive the pin to define distinct angular positions between the post and the base. The opposite end of the post or tubular member again has a plurality of angularly related recesses which are adapted to receive a second pin extending across a second socket that is connected to the light support so that the light support can be held in a plurality of distinct angularly related positions with respect to the post.

The emergency floodlighting system is adapted to be erected merely by supporting the base on a solid structure, inserting the tubular member into the upwardly directed socket after the light assembly is telescoped on the opposite upper end of the post.

According to a further aspect of the invention, the respective sets of recesses on opposite ends of the post are angularly offset from each other to increase the number of distinct positions between the light support and the base.

The base can be a portable type base that consists of substantially L-shaped lug that has the socket on one leg and the second leg adapted to be receivable into a slot which is normally found on the bed of a pick-up truck. In an alternate form, the base can be a substantially C-shaped member that has a base portion which may be permanently attached to a vehicle frame to define an upwardly open socket that is supported on the legs thereof.

In either embodiment of the invention, the height adjustment can readily be made by utilizing posts of different lengths and, as explained above, the angle of adjustment circumscribes an arc of 360°.

BRIEF DESCRIPTION OF SEVERAL VIEWS OF DRAWINGS

FIG. 1 shows the portable lighting system having a support constructed in accordance with the teachings of the present invention;

FIG. 2 is an exploded perspective view of the components illustrated in FIG. 1;

FIG. 3 is a cross-sectional view as viewed along line 3—3 of FIG. 1;

FIG. 4 is a cross-sectional view as viewed generally along line 4—4 of FIG. 1;

FIG. 5 shows the upper portion of the emergency lighting system having a modified form of light array supported thereon; and, FIG. 6 is a slightly modified form of base that can be permanently attached to a vehicle.

DETAILED DESCRIPTION

While this invention is susceptible of embodiment in many different forms, there is shown in the drawing and will herein be described in detail preferred embodiments of the invention with the understanding that the present disclosure to be considered as an exemplification of the principles of the invention and is not intended to limit the invention to the embodiments illustrated.

FIG. 1 of the drawings discloses a portable emergency lighting system, generally designated by reference numeral 10. The lighting system may be considered as including three major components, namely, a base 12, an elongated post or support 14, and a lighting assembly 16 at the opposite end of the post.

Base 12 is illustrated in detail in FIGS. 1 and 2 and includes a generally L-shaped bracket which has a vertical leg 20 defining a lug that is adapted to be received into a slot 22 that is normally found on the truck bed 24 of a conventional pick-up truck. Truck bed 24 may be considered part of the frame of the vehicle for descriptive purposes.

Base 12 has a second generally horizontal leg 26 which may be secured to the vertical leg 20 through a plurality of screws (not shown). The second horizontal leg has a substantially semi-circular recess 28 extending from the free end thereof and a bracket 30 of dimensions corresponding substantially to the cross-section of leg 26 likewise has a cooperating semi-circular recess 32 to define a circular opening. A socket or tube 34 is adapted to be received into recesses 28 and 30 and held in a secure position thereon through screws 36 received into openings in bracket 30 and leg 26. A pin 38 is received through an opening 40 in bracket 30 and also through openings (not shown) in the wall of tubular member or socket 34 so that the pin extends across the internal opening 40 of socket 34.

The second major component for the emergency portable lighting system includes vertical post 14 which may be in the form of a hollow circular tubular member 42, which is of a size the corresponds substantially to opening 40 in socket 34 to be telescoped therein. One end 43 of tubular member or post 14 has a plurality of angularly related recesses 44, four in number being illustrated in FIG. 4, each of which is adapted to receive pin 38 therein to define a plurality of distinct angularly related positions between socket 34 and post 42. For example, with four sets of recesses 44 at the lower end of post 42, which are preferably equally spaced from each other, would allow the post to be inserted in four distinct angular positions with respect to the base, for a purpose that will be described later.

Post 42 has a second set of recesses 46 at the opposite end thereof and the recesses 46 are preferably angularly offset with respect to the recesses 44. For example, if four recesses are included in each set and are spaced from each other by an angular dimension of 90°, the respective sets of recesses 44 and 46 would preferably be offset from each other by an angular dimension of 45°, for a purpose that will be described later.

The lighting assembly 16, includes an elongated bar 50 which has a downwardly directed open socket 52 extending therefrom and socket 52 again has a pin 54 extending across the opening therein. Socket 52 is adapted to be telescoped over the upper end of post 42 and preferably, again, the opening has a dimension corresponding substantially to the outer diameter of vertical post 42.

With the support assembly so far described, the elongated bar 50 can easily be positioned at eight distinct angular positions with respect to the fixed base 12 merely manipulating the bar with respect to the upper end of the post to have the pin received into a selected recess 46 extending across the upper end of post 42. The angular position of the elongated bar 50 with respect to base 12 can be further changed by selecting the appropriate recess 44 that receives pin 36.

In the arrangement so far described, the elongated bar can be positioned in four distinct angular positions with respect to the upper end of post 42 for each of the four angularly related recesses 44 on the lower end of the post.

The lighting array may be in any form and, in the embodiment illustrated in FIG. 1, the lighting array consists of three identical floodlights 60 which are supported on elongated bar 50 by three identical adjustable support means 62. Each adjustable support means 62 includes a bracket 64 (FIG. 2) which is supported on elongated bar 50 through a bolt 66. The bolt 66 provides a generally vertical pivot axis 68 for bracket 64 so that the bracket can be turned through an arc of 360° and held in any desired adjusted position by bolt 66.

Bracket 64 is a specially designed bracket which has a socket 69 that defines a generally horizontal pivot axis 70 between floodlight 60 and bracket 64. The socket 69 defining pivot axis 70 is preferably hollow and is designed to have the electrical wiring extending from the light through bracket 64 incorporated therein and operatively connected to a waterproof cord 74. Light 60 is held in an adjusted position by a screw 75.

Waterproof cord 74 from each light assembly 60 leads to a single junction box 76 which has an extension cord 78 extending therefrom that is adapted to be attached to a power source, such as a power generator. Thus, the single bracket 62 provides adjustment in two perpendicular axes 68 and 70 for directing the light source to any given point and the three light assemblies illustrated in FIG. 1 can be adjusted so as to provide the desired light array in a given direction which can also then be adjusted 360° about the axis of vertical post 42.

The respective lights 60 are preferably commercially available products sold by Hubbell Lighting, Division of Hubbell, Inc., Electric Way, Christiansburg, Va., as model No. QL.-series Quartz Lighting Floodlights. Also, the dual adjusting bracket 62 is a specially designed bracket having the wiring incorporated therein and is available from the above company and identified as Bracket Model #QL-TB.

A slightly modified array of light is illustrated in FIG. 5 wherein a bar 50 has four light assemblies 60 supported thereon with two such light assemblies extending above bar 50 while the other two extend below bar 50. A further alternate arrangement for the lighting array would be to have three lights as illustrated in FIG. 1 along the upper edge of the bar and two lights as illustrated in FIG. 5 on the lower edge of the bar. It will be appreciated that the number of lights on the assembly arrangement on support bar is strictly a matter of design and the invention is not limited to any number of such lights.

A further slightly modified form of base structure is illustrated in FIG. 6 and consists of a base 12a that has a generally vertical socket 34a supported on a substantially C-shaped bracket 80. C-shaped bracket 80 has a generally flat base portion 82 that is adapted to be attached to the side of a vehicle body 24a and has two generally horizontally extending vertically spaced legs 84. Socket 34a is substantially identical to socket 34 and again has a pin 38 extending across the internal opening intermediate opposite ends thereof and is supported on legs 84.

Thus, the two base assemblies 12 and 12a can be used interchangeably with a single post arrangement 42 and base 12a could be permanently attached to a vehicle, such as fire vehicle apparatus while the portable mounting base 12 could be utilized as an alternate support on a vehicle such as a pick-up truck which may normally form part of the equipment of a fire company.

As can be appreciated from the above description, the present invention provides a unique arrangement for supporting a portable emergency lighting system. The emergency lighting system can easily be carried as part of the support equipment for any function and can be assembled in a very short period of time merely by inserting the light assembly 16 on the upper end of the post, and then inserting the post into the base socket at the desired angular position for the lighting array.

I claim:

1. A portable lighting system comprising a bar having a plurality of directional floodlights thereon, a socket on said bar having an open end with pin means extending across said socket spaced from said open end, and a support including an elongated tubular member having a plurality of angularly related recesses respectively adapted to receive said pin means to support said bar in a plurality of angularly related positions on said support.

2. A portable lighting system as defined in claim 1, in which said support includes a base defining an upwardly directed socket having a second pin means extending across said socket, said tubular member having a plurality of angularly related second recesses respectively adapted to support said tubular member and bar at a plurality of angularly related positions with respect to said base.

3. A portable lighting system as defined in claim 2, in which base includes a lug adapted to be releasably retained in a slot defined in a vehicle frame.

4. A portable lighting system as defined in claim 2, in which there are at least four first recesses having substantially equal angular spacing on one end of said tubular member and at least four second recesses having substantially equal angular spacing on an opposite end with said first and second recesses angularly offset from each other to increase the number of angularly related positions for said bar with respect to said base.

5. A portable lighting system as defined in claim 2, in which said base includes a substantially C-shaped member having a base portion and a pair of legs extending from said base portion with a circular tube supported on said legs, said tube having a pin extending diametrically across an opening in the center thereof to define said second pin means.

6. A portable lighting system as defined in claim 2, further including means between said bar and each floodlight providing adjustment about two perpendicular axes.

7. A portable lighting system comprising a base having an upwardly open socket, an elongated post having opposite ends with one end received in said socket, first engaging means between said socket and said one end of said elongated post defining a plurality of distinct angular positions for said elongated post on said base, light means supported on the other end of said elongated post, and second engaging means between said elongated post and said second socket defining a plurality of distinct positions between said bar and said elongated post for each distinct position between said elongated post and said base.

8. A portable lighting system as defined in claim 7, in which said post has a set of angularly related recesses on each end of said posts and each socket has a pin adapted to be received into each recess on an associated end of said post.

9. A portable lighting system as defined in claim 8, in which there are at least four angularly related recesses in each set on each end of said elongated post and the sets of recesses on opposite ends of said elongated post are offset from each other.

10. An adjustable support for an elongated bar having a directed mechanism thereon comprising: a base having a socket defining an upwardly directed opening with a pin extending across said opening, a tubular member corresponding substantially in size to said opening and having one end adapted to be telescoped into said socket, said one end of said tubular member having engaging means with said pin defining a plurality of distinct angularly related positions between said socket and said tubular member, said elongated bar having a second downwardly directed socket having an opening and adapted to be telescoped over the other end of said tubular member and having a second pin extending across the opening therein, said other end of said tubular member having second engaging means with said second pin and defining a plurality of distinct angularly related positions between said bar and said tubular member so that said elongated bar can be adjusted to a plurality of distinct positions circumscribing an arc of 360° with respect to said base.

11. An adjustable support mechanism as defined in claim 10, in which each end of said tubular member has a set of angularly related recesses defining said first and second engaging means and the sets of recesses are identical in number and are equally spaced from each other with the respective sets angularly offset.

* * * * *